United States Patent [19]

Kim

[11] Patent Number: 4,916,442
[45] Date of Patent: Apr. 10, 1990

[54] VERTICAL PRE-CONTROL CIRCUIT FOR AN INTERFACE OF A MULTI-SYNCHRONIZATION MONITOR

[75] Inventor: Kwang-Seok Kim, Suwon, Rep. of Korea

[73] Assignee: Samsung Electronics Co., Ltd., Swon, Rep. of Korea

[21] Appl. No.: 290,742

[22] Filed: Dec. 27, 1988

[30] Foreign Application Priority Data

Dec. 31, 1987 [KR] Rep. of Korea .............. 87-24382[U]

[51] Int. Cl.$^4$ .............................................. H04N 5/04
[52] U.S. Cl. ..................................... 340/814; 358/158
[58] Field of Search ............... 340/703, 702, 701, 731; 358/158, 148, 150

[56] References Cited

U.S. PATENT DOCUMENTS 4,727,362 2/1988 Rackley et al. ..................... 340/703
4,779,132 10/1988 McBeath et al. ................... 340/814

Primary Examiner—Alvin Oberley
Attorney, Agent, or Firm—Ladas & Parry

[57] ABSTRACT

In a vertical pre-control circuit for an interface of a multi-synchronization monitor that correlates the one of a computer system and adapter connected to the vertical pre-control circuit to a CRT monitor, the vertical pre-control circuit has first, second and third oscillation sections connected to an output terminal for connection to the CRT monitor, the first, second and third oscillation sections providing, when enabled, respective signals to the output terminal respectively characteristic of the one of the computer system and adapter. First and second logic sections respectively respond to positive waveforms of horizontal and vertical synchronization signals from respective terminals respectively for connection to the one of the computer system and adapter for enabling, respectively, the first and second oscillation sections. A logic controller responds to a specific frequency of the horizontal synchronization signal for overridingly disabling an enabled one of the first and second oscillation sections. A terminal for receiving, when connected to the adapter, a signal characteristic of the adapter is connected to the third oscillation section for enabling the same with the signal characteristic of the adapter. A third logic section responds to the signal characteristic of the adapter for overridingly disabling the first and second oscillation sections.

3 Claims, 3 Drawing Sheets

| SYSTEM | TIMNING CHART ($^V_H$) | SYSTEM | TIMNING CHART ($^V_H$) | SYSTEM | TIMNING CHART ($^V_H$) |
|---|---|---|---|---|---|
| PS/2 -I OR II | H:31.5KHz  V:70Hz  ⊢12.7nS⊣  ⊢14.29nS⊣  W | PGA | H:31.5KHz  V:60Hz  ⊢13.15nS⊣  ⊢16.67nS⊣ | GEN-ERAL ZONE | H:15.8KHz  V:60Hz  ⊢12.8nS⊣  ⊢16.67nS⊣ |
| PS/2 -III | H:31.5KHz  V:70Hz  ⊢11nS⊣  ⊢14.29nS⊣ | EGA -I | H:15.8KHz  V:60Hz  ⊢12.8nS⊣  ⊢16.67nS⊣ | GEN-ERAL ZONE | H:21.8KHz  V:60Hz  ⊢16nS⊣  ⊢16.67nS⊣ |
| PS/2 -IV | H:31.5KHz  V:60Hz  ⊢15.24nS⊣  ⊢16.67nS⊣ | EGA -II | H:21.8KHz  V:60Hz  ⊢16nS⊣  ⊢16.67nS⊣ | GEN-ERAL ZONE | H:31.5KHz  V:60Hz  ⊢15.7nS⊣  ⊢16.67nS⊣ |

FIG.1 PRIOR ART

VERTICAL PRE-CONTROL CIRCUIT FOR AN INTERFACE OF A MULTI-SYNCHRONIZATION MONITOR

BACKGROUND OF THE INVENTION

This invention relates to a vertical precontrol circuit for an interface of a multi-synchronization monitor.

Generally, when a personal computer transfers character or graphic data signals to a CRT (cathode ray tube) monitor for display, vertical and horizontal synchronization signals for completing a video signal for the display are applied to the monitor separately from the data signals. The frequencies and waveform polarities required for the vertical and horizontal synchronization signals differ, however, according to the make of the personal computer and/or monitor, and are also different according to functions of the data (e.g., character or graphic) for the same make of some personal computers. Moreover, because of the different polarities (positive and negative) of some vertical and horizontal synchronization signal waveforms for some personal computers, these need a special corresponding CRT monitor or synchronization signal generator.

On some present CRT monitors, therefore, in order to provide the monitor with all the vertical and horizontal synchronization signal frequencies and polarities required for compatibly with various makes of personal computers, external switches are used for selecting and processing the synchronization signals in accordance with the data character and make of the respective personal computers with which they are used. These external switches are slide switches, however, so that, not only does the user have the inconvenience of properly sliding the switches, but also there is the fault that multiple displays of, for example, an EGA (Enhanced Graphics Adapter), PGA (Professional Graphics Adapter) and PS/2 (IBM Personal System/2), which are classified as different signal sources on these switches, are impossible.

SUMMARY OF THE INVENTION

It is an object of this invention, therefore, to provide a vertical pre-control circuit for an interface between a CRT monitor and a personal computer to make the monitor compatible with various makes and functions of personal computers, such as those made by and other manufacturers, for providing vertical synchronization signals for the monitor for each make and functional mode.

To this and other ends a vertical pre-control circuit for an interface of a multi-synchronization monitor that correlates the one of a computer system and adapter connected to the vertical pre-control circuit to a CRT monitor has first, second and third oscillation sections connected to an output terminal for connection to the CRT monitor, the first, second and third oscillation sections providing, when enabled, respective signals to the output terminal respectively characteristic of the one of the computer system and adapter. First and second logic sections respectively respond to positive waveforms of horizontal and vertical synchronization signals from respective terminals respectively for connection to the one of the computer system and adapter for enabling, respectively, the first and second oscillation sections. A logic controller responds to a specific frequency of the horizontal synchronization signal for overridingly disabling an enabled one of the first and second oscillation sections. A terminal for receiving, when connected to the adapter, a signal characteristic of the adapter is connected to the third oscillation section for enabling the same with the signal characteristic of the adapter. A third logic section responds to the signal characteristic of the adapter for overridingly disabling the first and second oscillation sections.

BRIEF DESCRIPTION OF THE DRAWING

The novel and other features and advantages believed characteristic of the invention are set forth in the following detailed description of a particular, merely preferred embodiment, in conjunction with the accompanying drawing wherein:

FIG. 1 illustrates vertical and horizontal synchronization signal frequencies and waveforms of display interfaces for various computer systems;

DETAILED DESCRIPTION OF THE PREFERRED EMBODIMENT

FIG. 1 shows waveforms at W, for example, of vertical V and horizontal H synchronization signals at the display interfaces of various systems identified at the left of the vertical and horizontal synchronization signal waveforms (Timing Chart columns) for representative IBM personal computer systems (e.g. PS II), adapter systems (e.g. PGA) and others' personal computer systems (collectively "General Zone"), left to right, respectively, in System columns of FIG. 1. The relative polarity of each signal waveform is shown graphically and the timing thereof is enumerated adjacently. Thus, for example, vertical and horizontal synchronization signal waveforms of the PGA system may be seen to both have positive polarities and frequencies of 31.5 KHZ and 60 HZ, respectively. For another example, the horizontal synchronization signal waveform of the EGA-II system may be seen to have a positive polarity with a frequency of 21.8 KHz, and the vertical synchronization signal waveform of the EGA-II system may be seen to have a negative polarity with a frequency of 60 Hz.

Figure 2:
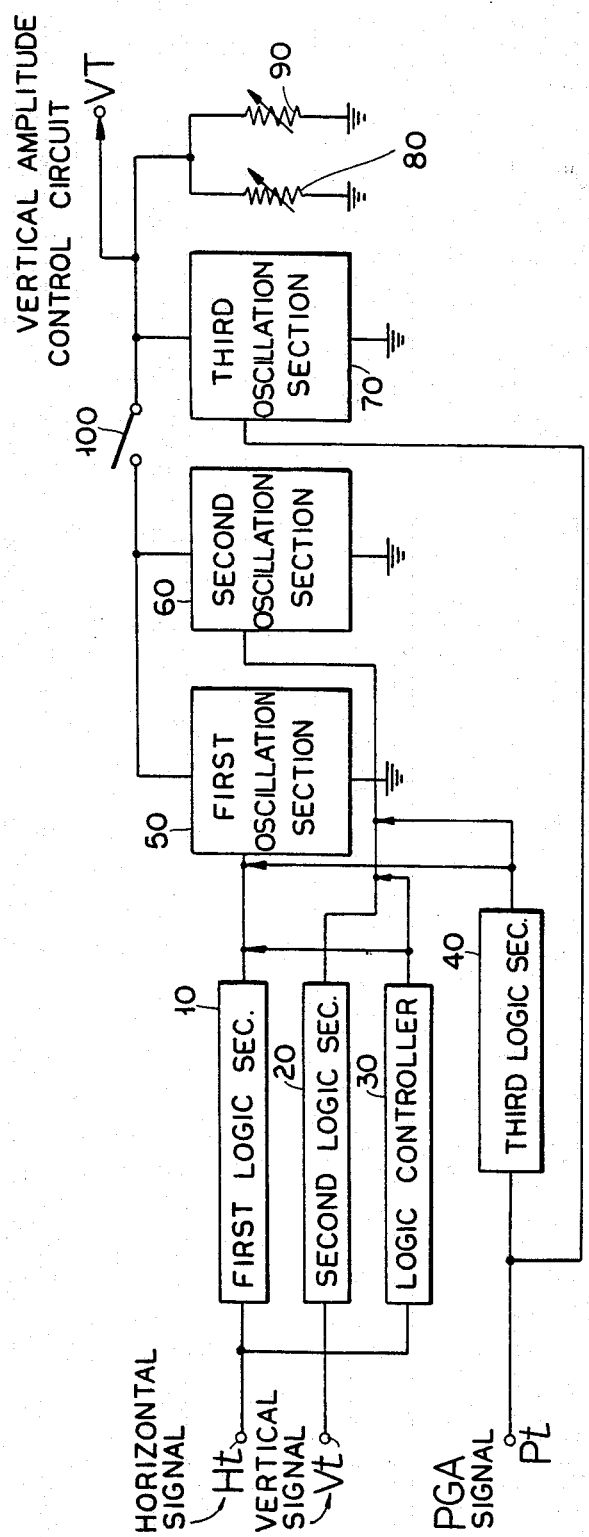
FIG. 2 is a block diagram of the preferred embodiment of a vertical pre-control circuit for an interface of a multi-synchronization monitor according to the present invention.

FIG. 2 shows in block diagram a vertical precontrol circuit for an interface of a multi-synchronization monitor according to a preferred embodiment of the present invention. In FIG. 2, first, second and third logic sections 10, 20 and 40, respectively connect terminals Ht, Vt and Pt for horizontal, vertical and PGA signals, respectively, from a computer and PGA adapter systems to first and second oscillation sections 50 and 60. The PGA signal terminal Pt is also connected to a third oscillation section 70. A logic controller 30 connects the horizontal signal terminal Ht to both of the first and second oscillation sections 50 and 60. A switch 100 connects signal-output ports of the first and second oscillation sections 50 and 60 to one end of parallel variable resistors 80 and 90 and to a terminal VT for connection to the vertical amplitude control circuit of a CRT monitor (not shown). A signal-output port of the third oscillation section 70 is also connected to the one end of variable resistors 80 and 90 and to terminal VT.

The opposite ends of the variable resistors 80 and 90 are grounded.

In operation, the first logic section 10 sends an enable signal to the first oscillation section 50 only when a horizontal synchronization signal at the terminal Ht has a positive polarity. The second logic section 20 sends an enable signal to the second oscillation section 60 only when a vertical synchronization signal at the terminal Vt has a positive polarity. The third logic part 40 sends an overriding disable signal to the first and second oscillation sections 50 and 60 only when a PGA signal is applied at the terminal Pt, i.e. has a high logic level. The PGA signal at terminal Pt also enables the third oscillation section 70. The output signal of the third oscillation section 70 is controlled by the variable resistors 80 and 90. The variable resistor 80 controls the vertical amplitude of the output signal when the PGA signal is applied to the port Pt, and the variable resistor 90 controls the fundamental vertical amplitude. The first, second and third oscillation sections 50, 60 and 70 send out specific signals, when oscillators 51, 61 and 71 thereof are enabled, at frequencies controlled by variable resistors 52, 62, 72 respectively associated with the oscillators. The logic controller 30 sends an overriding disable signal to the first and second oscillation sections only when the frequency of a horizontal synchronization signal at terminal Ht is below 25 KHz. The switch 100 functions to differentiate the General Zone systems from IBM systems. It should be an analog switch responsive to logic components like those of the first and second logic sections. A manual switch is shown, however, because the user is so easily able to determine, by visual inspection, whether the personal computer system in use is one from IBM. The switch 100 is a connector, i.e. closed, only when an IBM computer system is used to provide the horizontal and vertical synchronization signals to terminals Ht and Vt.

Specific examples of operation will now be described with reference to FIG. 3, which is a detailed diagram of the preferred embodiment of FIG. 2.

When vertical and horizontal synchronization signals from any of the computer systems represented by the General Zone signal column of FIG. 1 are applied to terminals Vt and Ht (FIGS. 2 and 3), the vertical and horizontal synchronization signal waveforms both have positive polarities.

Both of the first and second logic sections 10 and 20 thus send enable signals to the first and second oscillation sections. With two of the General Zone computer systems shown in FIG. 1 (the upper two), however, the frequencies of their horizontal synchronization signals are below 25 KHz, and the logic controller 30 sends its overriding disable signal to the first and second oscillation sections, which are not, therefore, in fact enabled to operate. In both these cases, moreover, as well as with the third, lowermost computer system represented in FIG. 1, the switch 100 is open. As a result, enabled operation of the first and second oscillation sections in the third case has no effect.

Figure 3:
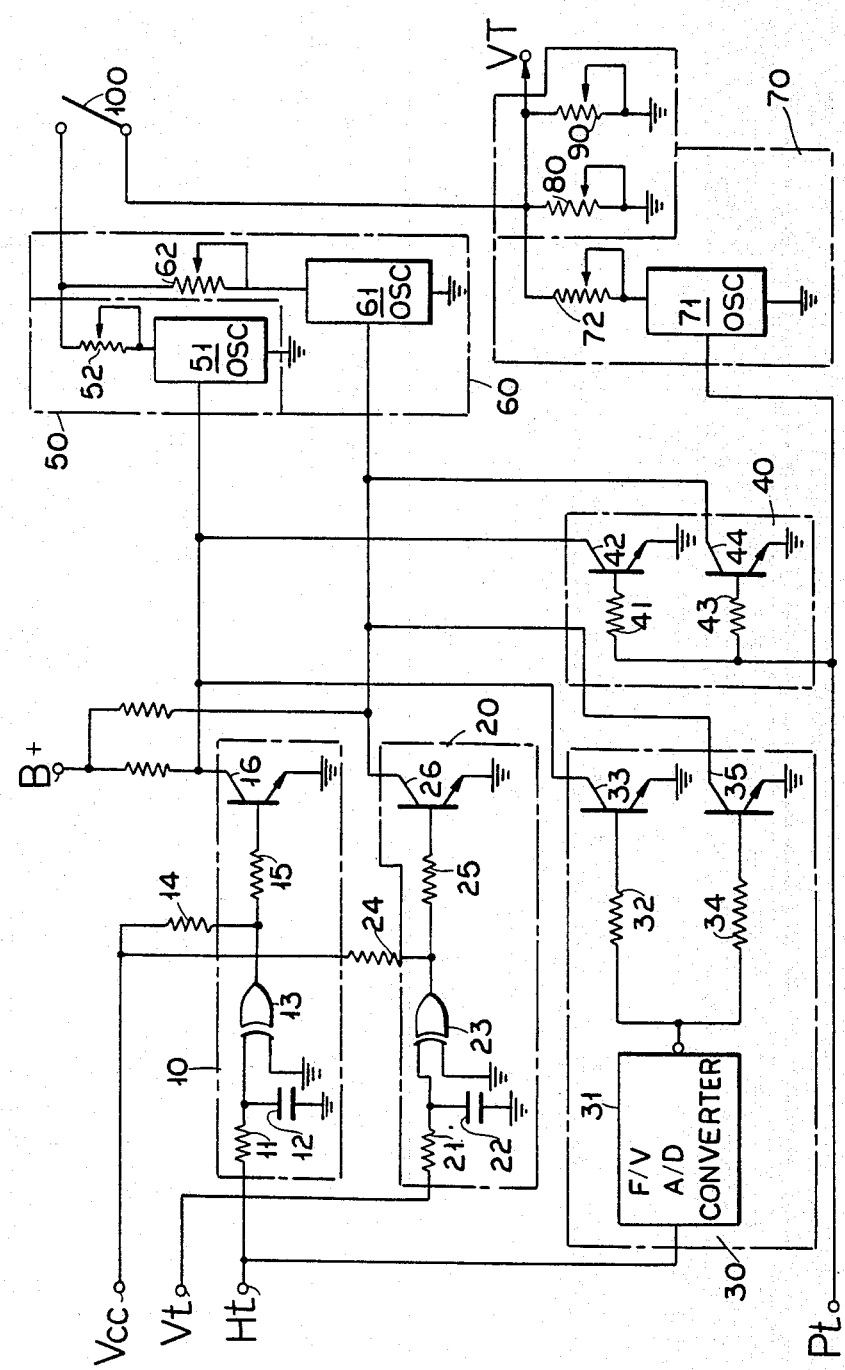
FIG. 3 is a detailed circuit diagram of the preferred embodiment of FIG. 2.

Considering the computer system represented in the uppermost Timing Chart of the General Zone of FIG. 1 specifically in relation to FIG. 3, the positive horizontal synchronization signal waveforms (FIG. 1) from terminal Ht (FIG. 3) are applied to an integration circuit of resistor and capacitor 11 and 12 and, thereby, to one input port of an exclusive OR gate 13. The integration circuit filters out noise signals for accurate comparison of the positive horizontal synchronization signal waveforms on the one input port of the exclusive OR gate with that on its other input-port, which is grounded. The OR gate responds to the thus input port signals with a low logic level signal that, in conjunction with a bias voltage on a terminal Vcc and resistors 14, 15 disables a transistor 16 from conduction. Another bias voltage on a terminal $B^{30}$ connected to the collector of the transistor 16 and the first oscillation section 50 is, therefore, applied to the latter as the enable signal of the first logic section. This enable signal is, however, without effect for two reasons.

The first reason is that switch 100 is open, because the General Zone computer system under consideration is not an IBM system for which the switch is closed. The first oscillation section 50 is thus disconnected from the output terminal VT and can have no effect. The second reason is that the horizontal synchronization signal is also applied from terminal Ht to the logic controller 30.

The logic controller 30 receives the horizontal synchronization signal in an inverting frequency-to-voltage (F/V) analog-to-digital (A/D) converter 31. The low, 15.8 KHz horizontal synchronization signal frequency of the uppermost General Zone computer system of this example thus produces an output from the F/V converter sufficiently high to enable, through resistors 32 and 34, conduction of transistors 33 and 35. The former grounds the connection of the transistor 16 and first oscillation section 50, so as to disable the latter.

The other transistor 35 of the logic controller similarly grounds the connection of a transistor 26 of the second logic section 20 to the second oscillation circuit 60. The remainder of the second logic section 20, that is integration circuit resistor and capacitor 21 and 22, exclusive OR gate 23, and resistors 24 and 25, is the same as the first logic section 10 and, thus, neither its structure nor its corresponding operation on the vertical synchronization signal from terminal Vt needs to be explained again.

From this description of operation, it will be seen from a review of the vertical and horizontal synchronization signal waveform polarities and horizontal synchronization signal frequencies of the computer systems of FIG. 1 that only the IBM PS/2-I or II or PS/2-III and PGA systems have characteristics that could produce an output signal from terminal VT for particular control of a CRT monitor and that all the other systems have a common vertical synchronization signal characteristic frequency of 60 Hz for such operation of the CRT monitor when the vertical precontrol circuit of the invention is in this no-signal mode. Only the operation for the PS/2-I or II, PS/2-III and PGA systems thus needs to be explained further.

For the PS/2-I or II, the negative horizontal synchronization signal waveform polarity shown in FIG. 1, which is applied to terminal Ht when this system is in use, produces a high level input on the one port of the exclusive OR gate 13 that corresponds to a low input to other input port and, thus, a high level output to transistor 16. Transistor 16 thus conducts to ground the bias voltage B+ to the first oscillation section 50 and, thus, disables the latter in correspondence with transistor 33 of the logic controller as previously described. Also in correspondence with the previous description, the positive vertical synchronization signal waveform polarity shown in FIG. 1 for this PS/2 I or II system produces non-conduction of transistor 26 in the second logic section for enabling the second oscillation section. Because the PS/2 I or II system is from IBM, the user has closed switch 100 for connecting the second oscillation section to terminal VT. Thus, the enabled oscillation of the oscillator 61 in the second oscillation section at the frequency controlled by variable resistor 62 at terminal VT identifies this system (PS/2-I or II) for the CRT monitor to accommodate its different characteristics, such as its 70 Hz vertical synchronization signal frequency, for example.

Similarly, when the PS/2-III system is in use, the negative polarity of the vertical synchronization signal waveform shown in FIG. 1 does not enable the second oscillation section, but the positive polarity of the horizontal signal waveform does enable the first oscillation section and, unlike the case for the corresponding synchronization signal waveform polarities of the EGA-II system also shown in FIG. 1, the inverted frequency-to-voltage conversion of its high (over 25 KHz) 31.5 KHz horizontal synchronization signal frequency does not produce overriding, disabling conduction of transistor 33 in the logic controller 30. The resulting oscillation of oscillator 51 at a frequency controlled by resistor 52 at terminal VT through switch 100, closed by the user from the IBM identification of the system, thus characteristically identifies the PS/2-III system.

In contrast, the negative polarities of both the vertical and horizontal signal waveforms of the PS/2-IV system produce no oscillation-section enablements and, thus, no output signal at terminal VT, even though switch 100 is closed in recognition of the IBM origin in this system. As already noted, however, this corresponds with its 60 Hz vertical synchronization signal frequency, in common with the other systems producing this result.

Providing a differentiating output signal at terminal VT for use of a PGA system, for reasons other than its 60 Hz vertical synchronization signal frequency in common with the other systems, has to be done differently, however, because its positive vertical and horizontal synchronization signal waveforms and high horizontal synchronization signal frequency would otherwise lead to enablement of both of the first and second oscillation sections. Theoretically, this problem would be corrected by opening switch 100 in recognition of a non-IBM signal source system, but inasmuch as the PGA system is an adapter system that could be used with an IBM system, a user may not clearly understand that switch 100 should be open. Accordingly, the PGA system provides the high logic level signal to terminal Pt and, thereby, the third logic and oscillation sections 40 and 70. In the third logic section, the high logic level signal from terminal Pt, through parallel resistors 41 and 43 enables conduction of transistors 42 and 44, respectively, to overridingly ground out the enabling signals from the first and second logic sections which otherwise would result from the positive vertical and horizontal synchronization signal waveforms and high horizontal synchronization signal frequency as done for low horizontal synchronization signal frequencies in the logic controller 30. In the third oscillation section, the high logic level signal from the terminal Pt enables oscillator 71 to provide a signal to terminal VT at a frequency controlled by variable resistor 72 and additional variable resistors 80 and 90 even though switch 100 may have been opened, because switch 100 is not between the third oscillation section and the terminal VT. The signal from the third oscillation section thus at terminal VT characterizes the use of the PGA system to the CRT monitor.

As described above, therefore, the vertical pre-control circuit according to the present invention selects a signal for CRT monitor synchronization through the operation of the various logic and oscillation sections according to the species of personal computer or adapter system with which the CRT monitor is used. The invention has been described, therefore, by way of an embodiment for IBM and General Zone personal computer and specific adapter systems. However, the same effect could be obtained for other species of personal computer and adapter systems.

This invention is in no way limited, therefore, to the example described hereinabove. Various modifications of the disclosed embodiment, as well as other embodiments of the invention, will become apparent to persons skilled in the art upon reference to the description of the invention. It is, therefore, contemplated that the appended claims will cover any such modifications or embodiments as fall within the true scope of the invention.

What is claimed is:

1. In a vertical pre-control circuit for an interface of a multi-synchronization monitor that correlates the one of a computer system and adapter connected to the vertical pre-control circuit to a CRT monitor, the improvement wherein the vertical precontrol circuit comprises:

first, second and third oscillation sections (50, 60 and 70) connected to an output terminal (VT) for connection to a CRT monitor, the first, second and third oscillation sections providing, when enabled, respective signals to the output terminal respectively characteristic of one of a computer system and adapter;

first and second logic sections (10, 20) respectively responsive to positive waveforms of horizontal and vertical synchronization signals from respective terminals (Ht and Vt) respectively for connection to the one of the computer system and adapter for enabling, respectively, the first and second oscillation sections;

a logic controller (30) responsive to a specific frequency of the horizontal synchronization signal for overridingly disabling an enabled one of the first and second oscillation sections;

a terminal (Pt) for receiving, when connected to the adapter, a signal characteristic of the adapter, the terminal being connected to the third oscillation section for enabling the same with the signal characteristic of the adapter; and a third logic section (40) responsive to the signal characteristic of the adapter for overridingly disabling the first and second oscillation sections.

2. The vertical pre-control circuit of claim 1, wherein the first and second logic sections each comprise an integration circuit comprising a resistor and capacitor (10 and 11; 21 and 22) for respectively receiving the vertical and horizontal synchronization signal of the terminal thereof, and an exclusive OR gate (13; 23) responsive to the integration circuit for providing a signal for the enabling of the respective one of the first and second oscillation sections.

3. The vertical pre-control circuit of claim 1, and further comprising a switch (100) between the first and second oscillation sections and the output terminal for disconnecting the same when opened in response to one of the computer systems.

* * * * *